United States Patent [19]

Ueyama

[11] Patent Number: 5,640,837
[45] Date of Patent: Jun. 24, 1997

[54] CUTTING SECTION FOR A MOWER OR A HEDGE TRIMMER

[75] Inventor: Hisashi Ueyama, Okayama-ken, Japan

[73] Assignee: Nikkari Co., Ltd., Okayama, Japan

[21] Appl. No.: 501,379

[22] Filed: Jul. 12, 1995

[30] Foreign Application Priority Data

Sep. 8, 1994 [JP] Japan .................................. 6-215012
Sep. 8, 1994 [JP] Japan .................................. 6-215013

[51] Int. Cl.$^6$ ................................................ A01D 34/18
[52] U.S. Cl. ............................... 56/298; 56/300; 56/307; 56/259
[58] Field of Search ............................. 56/298, 236, 297, 56/300, 301, 307, 242, 259, 260; 411/175, 174

[56] References Cited

U.S. PATENT DOCUMENTS

| | | | |
|---|---|---|---|
| 1,970,668 | 8/1934 | Mish | 56/300 |
| 2,149,347 | 3/1939 | Johnson | 56/298 |
| 2,787,111 | 4/1957 | Templeton | 56/297 |
| 2,861,618 | 11/1958 | Tinnerman | 411/175 |
| 4,520,618 | 6/1985 | Sorenson et al. | 56/298 X |
| 5,048,277 | 9/1991 | Trimarco et al. | 56/236 |

FOREIGN PATENT DOCUMENTS 3-22909  1/1991  Japan .................................. 56/236

*Primary Examiner*—Terry Lee Melius
*Assistant Examiner*—Heather Shackelford
*Attorney, Agent, or Firm*—Nikaido, Marmelstein, Murray & Oram LLP

[57] ABSTRACT

There is provided a cutting section for a mower or a hedge trimmer. Such cutting section comprises a pair of elongate guide plates arranged at upper and lower positions respectively and secured at their rear ends on a transmission case of the mower, a pair of elongate cutter bars arranged one on top of another and received in a space formed between the pair of elongate guide plates, the rear end of each cutter bar being formed with a connecting portion projecting laterally and outwardly beyond the guide plates, and a pair of driving members arranged at upper and lower positions respectively and connected with the respective elongate cutter bars through the respective connecting portions, for reciprocatingly driving the elongate cutter bars by means of a crank mechanism. Each elongate cutter bat is formed with a plurality of elongate guide holes along the length thereof, and each such elongate guide hole is communicated with a cutout formed thereon, so that the two bars are adapted to be installed in position between the pair of elongate guide plates and to be detached therefrom without disassembling any one of the guide plates.

9 Claims, 8 Drawing Sheets

CUTTING SECTION FOR A MOWER OR A HEDGE TRIMMER

BACKGROUND OF THE INVENTION

The present invention relates to a grass cutting machine such as a mower or a hedge trimmer, particularly to a cutting section for a mower or a hedge trimmer.

A conventional grass cutting machine such as a mower or a hedge trimmer is usually provided with a cutting section as illustrated in FIG. 18. It is seen from FIG. 18 that such a cutting section includes a pair of elongate guide plates a and b which are arranged at upper and lower positions respectively and each secured on a transmission case c of a mower or a hedge trimmer, using two pairs of bolt/nut means d. The guide plates a and b are coupled with one another by several pairs of bolt/nut means e, arranged along the length of the guide plates. A bolt of each bolt/nut means e is surroundingly engaged with a spacer ring member (not shown) to ensure a predetermined space between the guide plates a and b. A pair of elongate cutter bars f and g lying one on top of another are slidably received in the space formed between the guide plates a and b. Each of the cutter bars f and g has a plurality of elongate guide holes (not shown) to surroundings, engage with the respective spacer ring members so that the cutter bars, when being driven reciprocatingly in the longitudinal direction thereof, can be guided properly by these spacer ring members.

Further, the rear ends of both the cutter bars f and g are drivingly connected with a crank mechanism (not shown) disposed within the transmission case c. The crank mechanism in turn is rotatingly driven by an engine through a clutch device (not shown). The transmission system thus constructed is adapted to drive the cutter bars f and g in such a manner that each of them moves reciprocatingly and always in an opposite direction to the other, longitudinally of the guide plates, whereby effecting a desired grass cutting operation.

However, with the passing of time in use of such a mower, the cutting edges of many blades on both the cutter bars f and g may become blunt, and it will be difficult to go on with the grass cutting operation if the blunt cutter bars are not replaced by new or newly properly treated ones.

In order to install a pair of new or newly properly treated cutter bars, it is at first necessary to remove the used cutter bars f and g from the position between the guide plates a and b. This however proves to be troublesome since it requires the entire cutting section including the transmission case c to be dismantled.

It is understood from FIG. 18 that in order to detach the cutter bars f and g from the cutting section, at first, all the bolt/nut means e have to be removed, then the two bolt/nut means d shall be removed from the transmission ease c and the transmission case c should be dismantled. However, many kinds of inconvenience will be encountered when such dismantlement is being conducted, especially in a field where the grass cutting operation is only half-finished.

The same inconveniences are also experienced when a pair of newly treated cutter bars are to be installed in positions on the mower, since the assembling operation shall be performed in a reversed order opposite to the above dismantlement. Moreover, even after the attachment of the newly treated cutter bars f and g has been finished, another difficulty will be encountered since a precise adjustment is required to form an exactly correct space for the cutter bars between the two guide plates a and b. Such adjustment is usually performed by screwing up or down a nut at each bolt/nut means e and this however often proves to be troublesome and the adjustment result is not always satisfactory, resulting in an incorrectly assembled cutting section.

SUMMARY OF THE INVENTION

An object of the present invention is to provide an improved cutting section for a mower or a hedge trimmer, in that a pair of cutter bars, which have become blunt after use, may be easily and quickly changed for new ones without a necessity of dismantling a pair of guide plates and transmission case.

According to the present invention, there is provided a cutting section for a mower or a hedge trimmer. Such cutting section comprises a pair of elongate guide plates arranged at upper and lower positions respectively by virtue of several coupling means arranged in the longitudinal direction thereof, the pair of elongate guide plates being secured at their rear ends on a transmission case of the mower or hedge trimmer, a pair of elongate cutter bars arranged one on top of another and received in a space formed between the pair of elongate guide plates, the rear end of each cutter bar being formed with a connecting portion projecting laterally and outwardly beyond the guide plates, and a pair of driving members arranged at upper and lower positions respectively and connected with the respective elongate cutter bars through the respective connecting portions, for reciprocatingly driving the elongate cutter bars by means of a crank mechanism. Each elongate cutter bar is formed with a plurality of elongate guide holes along the length thereof, and each such elongate guide hole is communicated with a cutout formed thereon, so that the two bars are adapted to be installed in position between the pair of elongate guide plates and to be detached therefrom without disassembling any one of the guide plates.

In an aspect of the present invention, each driving member is connected with a corresponding cutter bar by securing the outer end of the driving member to the connecting portion of the corresponding cutter bar using at least one screw member.

In another aspect of the present invention, the cutouts formed in communication with the elongate guide holes on each cutter bar are divided into two groups, one being arranged in a direction opposite to the other. Namely, one group of cutouts located chose to the rear end of each cutter bar are arranged to face in a direction opposite to the projecting direction of the connecting portion of the cutter bar, and the other group of cutouts located close to the front end of the cutter bar are arranged to face in the same direction as the projecting direction of the connecting portion.

In fact, the pair of elongate cutter bars are adapted to be installed in position between the pair of elongate guide plates and to be detached therefrom, by pivoting the pair of cutter bars like a pair of scissors without disassembling any one of the guide plates.

In another embodiment of the present invention, the cutouts formed in communication with the elongate guide holes on each cutter bar are arranged to face in a direction opposite to the projecting direction of the connecting portion of the cutter bar.

Therefore, the pair of elongate cutter bars are also adapted to be installed in position between the pair of elongate guide plates and to be detached therefrom, by laterally moving the two cutter bars leftwardly and rightwardly respectively without disassembling any one of the guide plates.

The other objects and features of this invention will become understood from the following descriptions with reference to the accompanying drawings.

DETAILED DESCRIPTION OF THE PREFERRED EMBODIMENT

Figure 1:
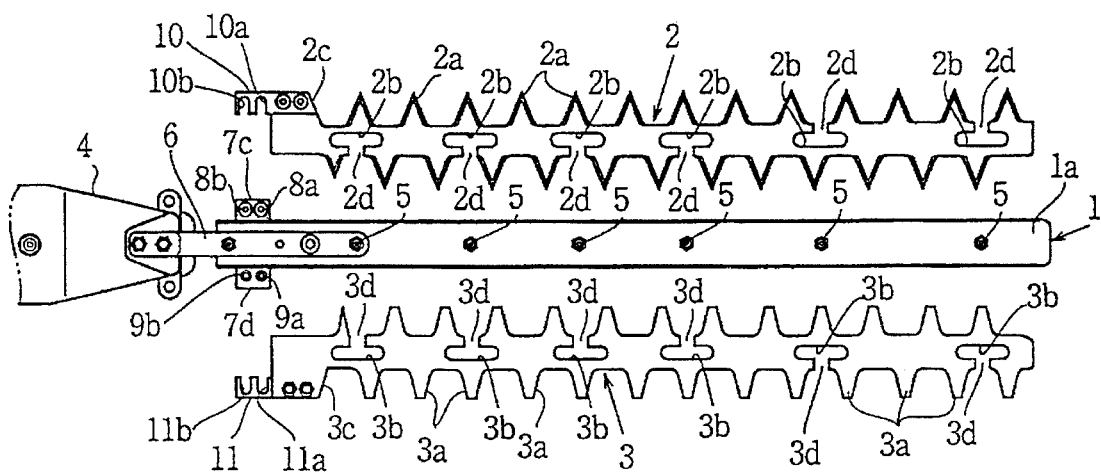
FIG. 1 is an exploded top plane view showing a cutting section for a mower or a hedge trimmer, according to the first embodiment of the present invention.
Figure 2:
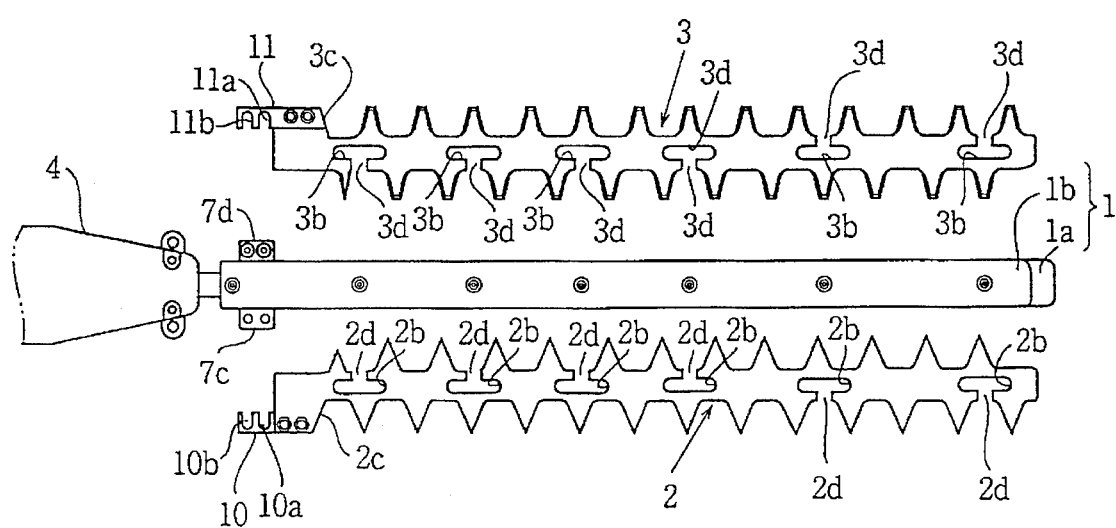
FIG. 2 is an exploded bottom plane view corresponding to the view of FIG. 1.

Referring to FIGS. 1 and 2 which are respectively exploded top and bottom plane views illustrating one embodiment of the present invention, reference numeral 1 represents a pair of guide plates including an upper plate 1a and a lower plate 1b, arranged at upper and lower positions respectively. Reference numeral 2 represents an upper cutter bar and 3 represents a lower cutter bar, both of which together constitute a pair of cutter bars to be arranged one on top of another so as to be installed in an elongate space between the two guide plates a and 1b. Reference numeral 4 represents a transmission case of a mower or a hedge trimmer.

Figure 3:
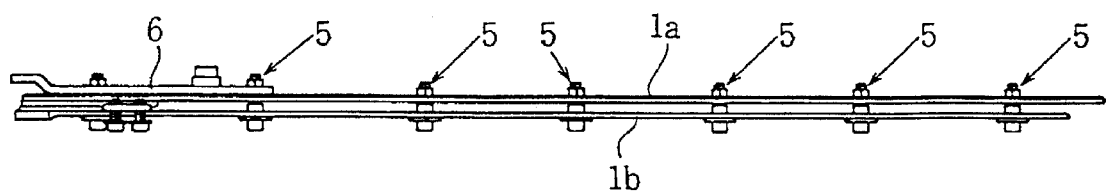
FIG. 3 is a side view showing a pair of guide plates assembled together by means of several coupling means.
Figure 4:
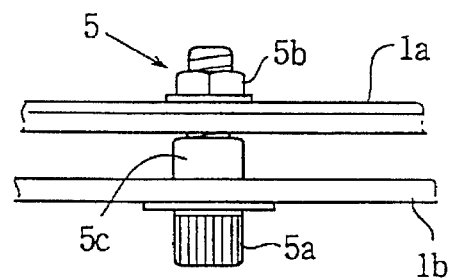
FIG. 4 is an enlarged side view showing a part of the assembled guide plates in detail, illustrating how the two guide plates ale coupled together.

The guide plates 1a and 1b are formed in a long and narrow shape, and are coupled to one another with a predetermined space therebetween using a plurality of coupling means 5, as illustrated in FIG. 3. FIG. 4 shows an enlarged side view illustrating how the two guide plates 1a and 1b are coupled together. As illustrated in FIG. 4, each coupling means 5 includes a bolt 5a and nut 5b. The bolt 5a is so formed as to pass through both the plates 1a and 1b, and the nut 5b is screwed down on the bolt 5a on the upper surface of the upper guide plate 1a. Further, each bolt 5a is surroundingly engaged with a ring-shaped spacer member 5c which is disposed between the plates 1a and 1b to ensure a predetermined space therebetween. Alternatively, a bolt 5a is so formed that it can also be used at the same time as a spacer member.

The pair of guide plates 1a and 1b, having been coupled in this way, are secured on to the transmission case 4 by securing the rear end of upper guide plate 1a to a support member 6 fixed with the transmission case 4.

Here, the transmission case 4 contains a crank mechanism (not shown) which is driven by an engine through a clutch device (not shown). The crank mechanism is connected with the inner ends of a pair of driving members 7a and 7b (see FIG. 5) arranged one on top of another, in such a manner that the each of the members 7a and 7b moves reciprocatingly and always in an opposite direction to the other, in the longitudinal direction along the length of the guide plates.

Figure 5:
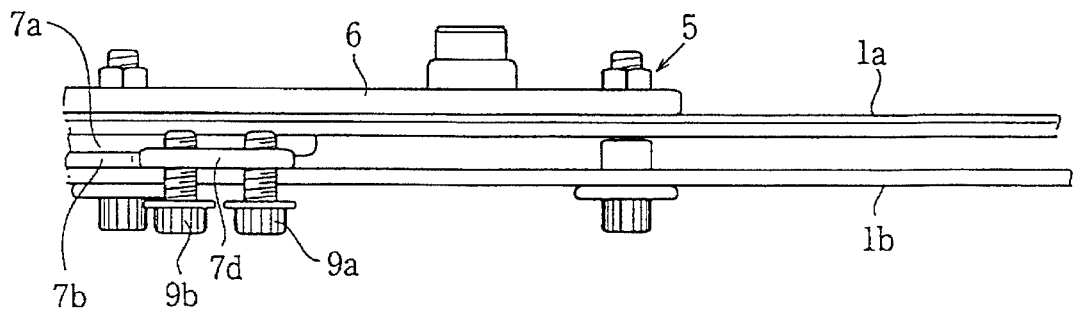
FIG. 5 is an enlarged side view showing a part of the cutting section, adjacent to the rear end thereof.

As shown in FIG. 5, the outer end portions of the driving members 7a and 7b are slidably held between the upper guide plate 1a and the lower guide plate 1b. Further, as indicated in FIG. 1, the upper driving member 7a has a connecting portion 7c projecting leftwardly (when viewed from the rear end of the cutting section). Similarly, the lower driving member 7b has a connecting portion 7d projecting rightwardly (when viewed from the rear end of the cutting section). The connecting portion 7c is provided with two clamping bolts 8a and 8b, and the connecting portion 7d is provided with two clamping bolts 9a and 9b.

The upper cutter bar 2 and the lower cutter bar 3 are brought together in such a manner that they are arranged one on top of another so as to be slidably installed between the two guide plates 1a and 1b. As shown in FIGS. 1 and 2, the cutter bar 2 has on the opposite sides thereof a lot of triangular cutting blades 2a which are arranged with a predetermined pitch and are formed to project leftwardly and rightwardly beyond the guide plates 1a and 1b. Similarly, the cutter bar 8 has on the opposite sides thereof a lot of trapezoidal cutting blades 3a which are also arranged with a predetermined pitch and are formed to project leftwardly and rightwardly beyond the guide plates 1a and 1b. Further, each of the cutter bars 2 and 3 has six elongate guide holes 2b or 3b, which are formed to surroundingly engage the spacer members 5c.

Integrally formed at the rear end of the upper cutter bar 2 is a connecting portion 2c which projects leftwardly (when viewed from the rear end of the cutting section), and secured on the upper surface of the connecting portion 2c is a connecting piece 10 which is adapted to be connected on the upper surface of the connecting portion 7c of the driving member 7a. The connecting piece 10 is formed with two U-shaped cutouts 10a and 10b to engage with the clamping bolts 8a and 8b of the connecting portion 7c. Similarly, integrally formed at the rear end of the lower cutter bar 3 is a connecting portion 3c which projects rightwardly (when viewed from the rear end of the cutting section). and secured on the underside face of the connecting portion 8c is a connecting piece 11 which is adapted to be engaged with the underside face of the connecting portion 7d of the driving member 7b. The connecting piece 11 is also formed with two U-shaped cutouts 11a and 11b to engage with the clamping bolts 9a and 9b of the connecting portion 7d.

Further, the six elongate guide holes 2b of the cutter bar 2 are communicated with six cutouts 2d respectively, which are formed to permit the passing of the respective spacer members 5c engaging with the coupling means 5 into and out of the respective guide holes 2b. Similarly, the six elongate guide holes 3b of the cutter bar 8 are communicated with six cutouts 3d respectively, which are also formed to permit the passing of the respective spacer members 5c engaging with the coupling means 5 into and out of the respective guide holes 3b.

Moreover, the six cutouts 2d formed in communication with the six guide holes 2b on the upper cutter bar 2 are divided into two groups, one being arranged in a direction opposite to the other. Namely, the first two cutouts 2d close to the front end of the cutter bar 2 are arranged to face in the same direction as the projecting direction of the connecting portion 2c. The rest four cutouts 2d close to the rear end of the cutter bar are arranged to face in a direction opposite to the projecting direction of the connecting portion 2c. Similarly, the six cutouts 3d formed in communication with the six guide holes 3b on the lower cutter bar 3 are also divided into two groups, one being arranged in a direction opposite to the other. Namely, the first two cutouts 3d close to the front end of the cutter bar 3 are arranged to face in the same direction as the projecting direction of the connecting portion 3c. The rest four cutouts close to the rear end of the cutter bar are arranged to face in a direction opposite to the projecting direction of the connecting portion 3c.

Figure 6:
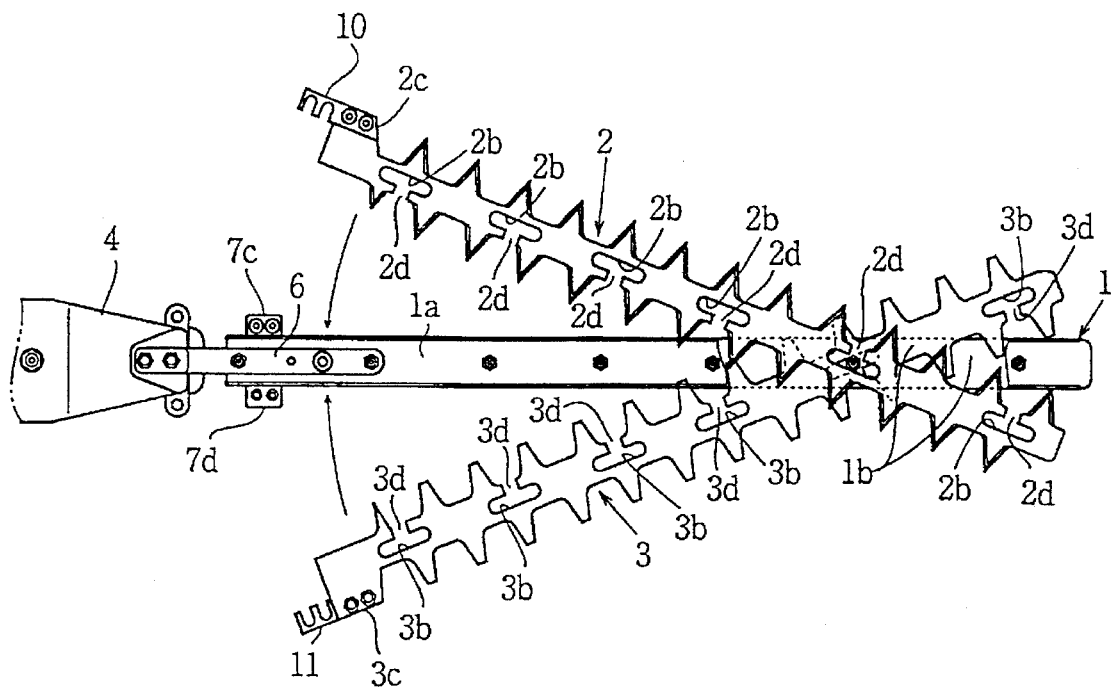
FIG. 6 is an explanatory top plane view, illustrating a pair of cutter bars being attached into a position between a pair of guide plates, at a first step.

FIG. 6 illustrates the operation of how to attach the upper cutter bar 2 and the lower cutter bar 3 in position between the pair of guide plates 1a and 1b which have already been assembled and fixed in position. As shown in FIG. 6, at first, the upper cutter bar 2 is disposed on the left side (when viewed from the rear end of the cutting section) of the pair of assembled guide plates 1a and 1b, with the connecting portion 2c (carrying the connecting piece 10) facing outward. Meanwhile, the lower cutter bar 3 arranged on the right side (when viewed from the rear end of the cutting section) of the assembled guide plates 1a and 1b. with the connecting portion 3c (carrying the connecting piece 11) facing outward. Then, the front end portion of the upper cutter bar 2 is inserted rightwardly into a position between the guide plates 1a and 1b and between the second and third coupling means 5 (counting from the front end of the guide plate 1a). Subsequently, the front end portion of the lower cutter bar 3 is inserted leftwardly into the same position.

Afterwards, the second cutout 2d communicated with the second elongate guide hole 2b (counting from the front end of the cutter bar 2) is aligned with the spacer member 5c engaged with the second coupling means 5, so that the spacer member 5c can pass through the cutout 2d and be engaged in the hole 2b. Similarly, the second cutout 3d communicated with the second elongate guide hole 3b (counting from the front end of the cutter bar 3) is aligned with the same spacer member 5c. so that the spacer member 5c can pass through the cutout 3d and be engaged in the hole 3b.

On the other hand, it is also possible that the third cutouts 2d and 3d (counting in the same manner as above) of the upper and lower cutter bars 2 and 3, are aligned with the the third spacer member 5c engaged with the third coupling means, so that the third spacer member 5c can pass through the third cutouts 2d and 3d and be engaged in the third guide holes 2b and 3b.

Figure 7:
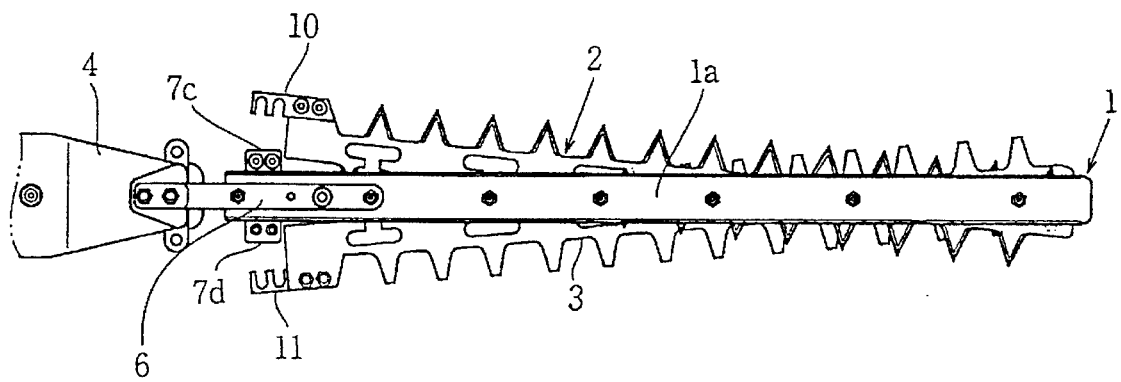
FIG. 7 is an explanatory top plane view, illustrating a condition where the attachment of the two cutter bars has been half-finished.

Subsequently, the upper and lower cutter bars 2 and 3, with the above second (or third) spacer member 5c being engaged in the r second (or third) elongate guide holes, are pivoted inward about the spacer member 5c hike a pair of scissors, from a position shown in FIG. 6 to a position shown in FIG. 7. In this way, all the spacer members 5c engaged with the respective coupling means 5 can pass through all the cutouts 2d and 3d so as to be received in the respective guide holes 2b and 3b of the cutter bars 2 and 3. At this moment, a situation as shown in FIG. 8 is reached.

Figure 8:
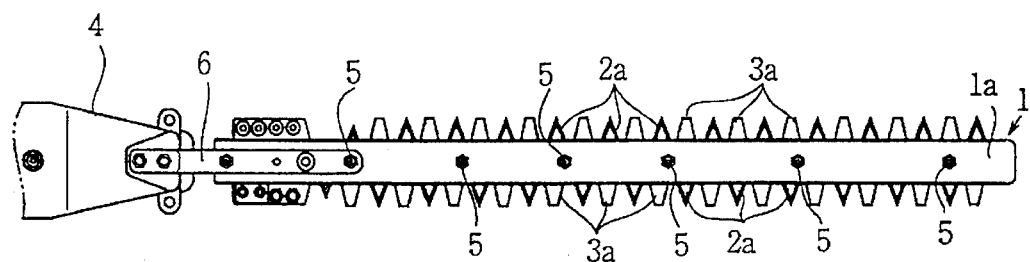
FIG. 8 is an explanatory top plane view, illustrating a condition where the attachment of the two cutter bars has been completely finished.
Figure 9:
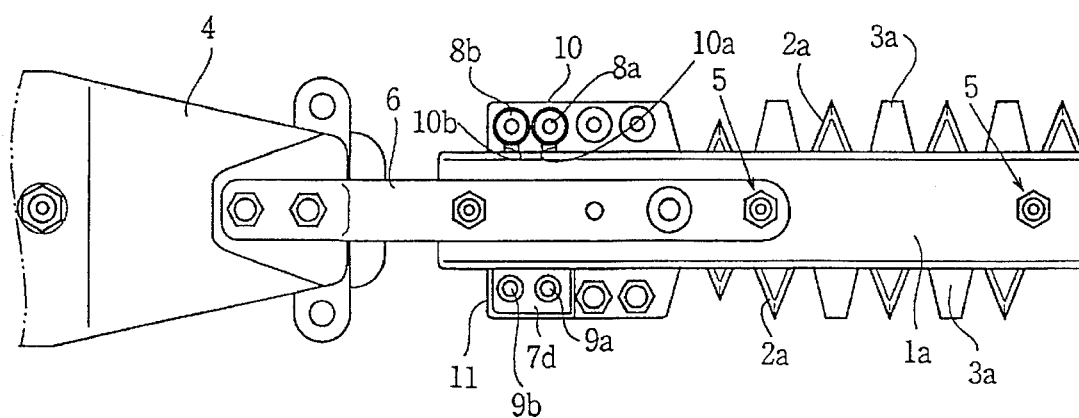
FIG. 9 is an enlarged top plane view, illustrating in detail the rear end portion of the completely assembled cutting section.
Figure 10:
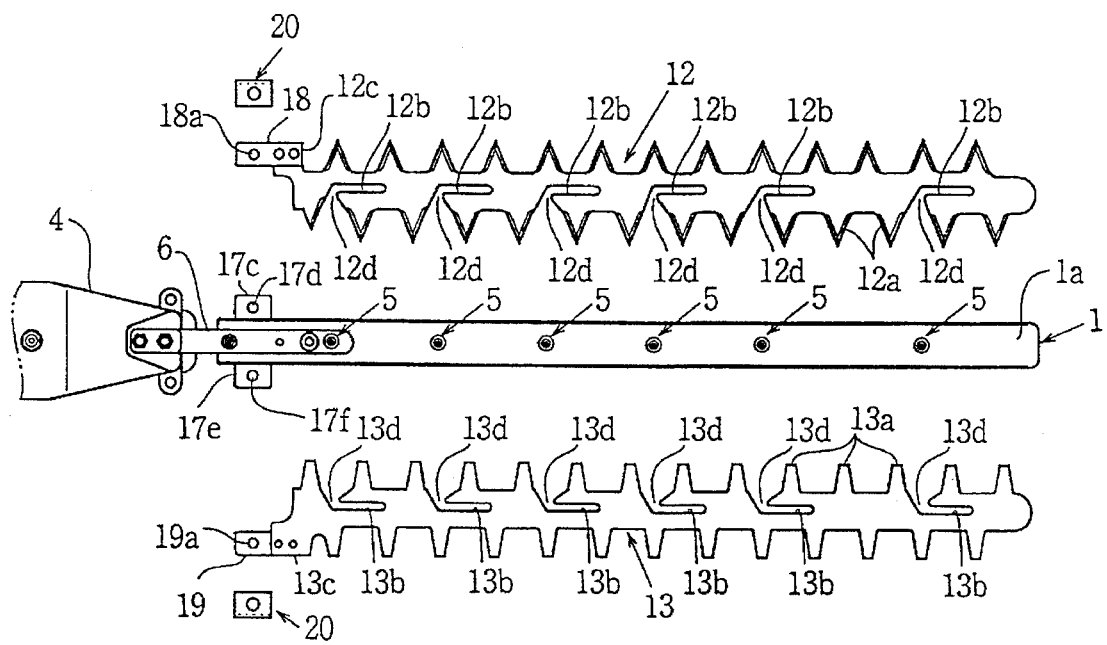
FIG. 10 is an exploded top plane view showing a cutting section for a mower or a hedge trimmer, according to the second embodiment of the present invention.
Figure 11:
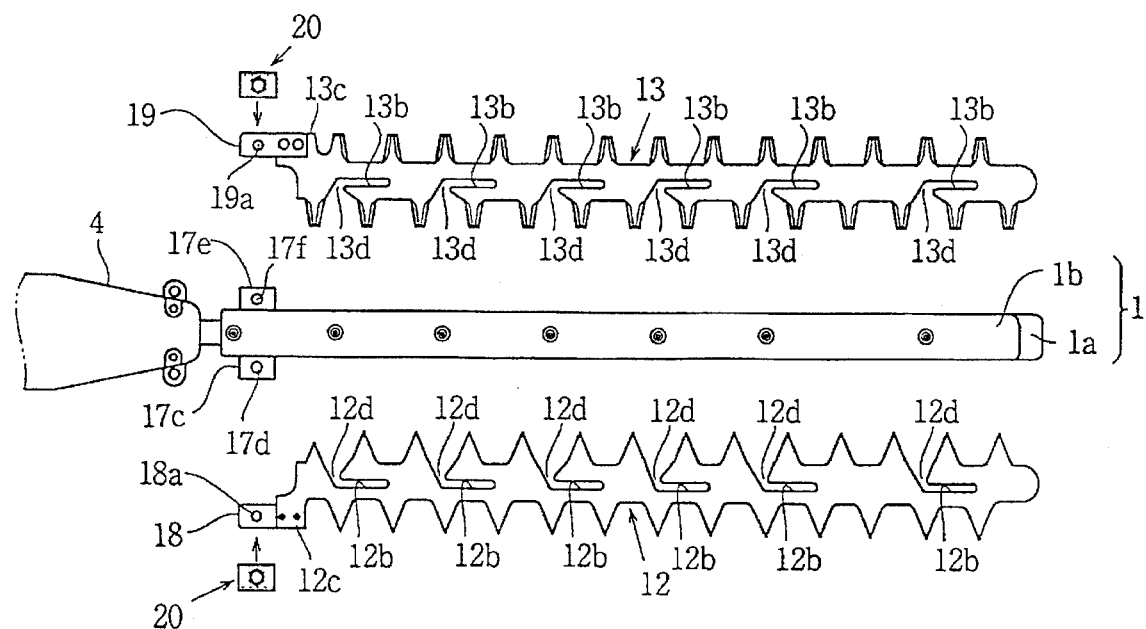
FIG. 11 is an exploded bottom plane view corresponding to the view of FIG. 10.
Figure 12:
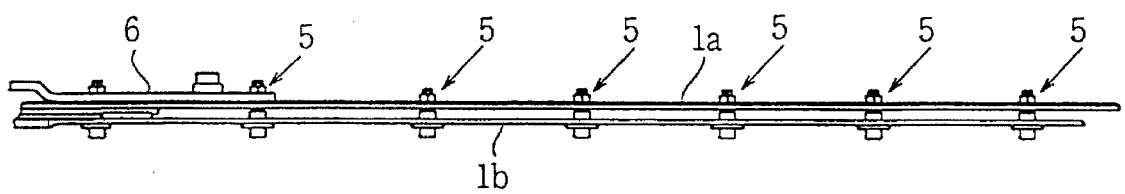
FIG. 12 is a side view showing a pair of guide plates in assembled condition, corresponding to the view of FIG. 10.
Figure 13:
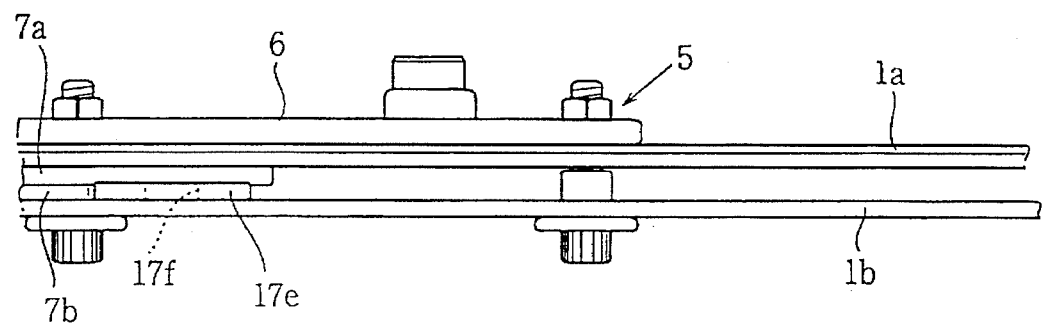
FIG. 13 is an enlarged side view showing a part of the cutting section of FIG. 10, adjacent to the rear end thereof.

In the situation as illustrated in FIG. 8, the connecting piece 10 of the upper cutter bar 2 is engaged on the upper surface of the connecting portion 7c of the upper driving member 7a, with the clamping bolts 8a and 8b engaged in the cutouts 10a and 10b. Similarly, the connecting piece 11 of the lower cutter bar 3 is engaged with the underside face of the connecting portion 7d of the lower driving member 7b, with the clamping bolts 9a and 9b engaged in the cutouts 11a and 11b. Therefore, by tightening the clamping bolts 8a, 8b, 9a and 9b, both the upper cutter bar 2 and lower cutter bar 3 can be firmly fixed in position on the cutting section and the entire assembling operation is completed.

Upon starting the engine (not shown) of the mower, the crank mechanism (not shown) within the transmission case 4 is driven through the clutch device (not shown), so that each of the driving members 7a and 7b moves reciprocatingly and always in an opposite direction to the other, enabling the upper cutter bar 2 and the lower cutter bar 8 to move in the same manner, with all the elongate guide holes 2b and 3b being guided by the respective spacer members 5c, whereby effecting a desired grass cutting operation.

On the other hand, with the passing of time in use of the cutting section, the cutting edges of the triangular and trapezoidal blades on the cutter bars 2 and 3 may become blunt so that both of them have to be replaced by new or newly treated ones. At this time, an operation for removing the used blunt cutter bars may be performed in an order opposite to the above attachment operation. Namely, upon loosening the clamping bolts 8a, 8b, 9a and 9b, the connecting pieces 10 and 11 may be removed from the connecting portions 7c and 7d, respectively. Then, holding at connecting pieces 10 and 11, the upper and lower cutter bars 2 and 3 are pivoted outwardly about the second spacer member 5c like a pair of scissors. Afterwards, the two cutter bars 2 and 3 are so moved that the second spacer member 5c may get out of the elongate guide holes 2b and 3b through the respective cutouts 2d and 3d. The entire detachment operation may thus be finished after moving out the front end portions of both the cutters 2 and 3.

FIGS. 10–17 illustrate another embodiment of the present invention.

As shown in FIGS. 10–13, integrally formed at the rear end of an upper cutter bar 12 is a connecting portion which projects leftwardly (when viewed from the rear end of the cutting section), and secured on the upper surface of the connecting portion 12c is a connecting piece 18 which is adapted to be connected on the upper surface of a connecting portion 17c of the diving member 7a. The connecting piece 18 is formed with a through hole 18a to be aligned with a through hole 17d of the connecting portion 17c of the upper driving member 7a. Similarly, integrally formed at the rear end of a lower cutter bar 13 is a connecting portion 13c which projects rightwardly (when viewed from the rear end of the cutting section), and secured on the underside face of the connecting portion 13c is a connecting piece 19 which is adapted to be engaged with the underside face of the connecting portion 17e of the driving member 7b. The connecting piece 19 is formed with a through hole 19a to be aligned with a through hole 17f of the connecting portion 17e of the lower driving member 7b.

Figure 14:
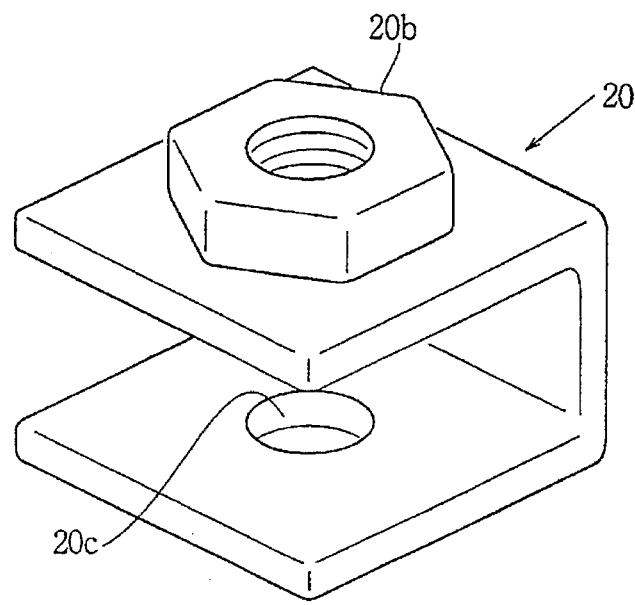
FIG. 14 is an enlarged perspective view showing a U-shaped retaining member.

The connecting piece 18 secured on the upper cutter bar 12 is fixed on the upper surface of the connecting portion 17e of the upper driving member 7a, by means of a bracket 20 (see FIG. 14). Similarly, the connecting piece 19 secured on the lower cutter bar 13 is fixed on the underside face of the connecting portion 17e of the lower driving member 7b, also by means of a bracket 20 (see FIG. 14). As shown in FIG. 14, the bracket 20 has a U-shaped cross section and has a pair of through holes 20c formed on the opposite side walls. Further, the bracket 20 has a nut 20b welded on the outer surface of one side wall thereof.

Figure 15:
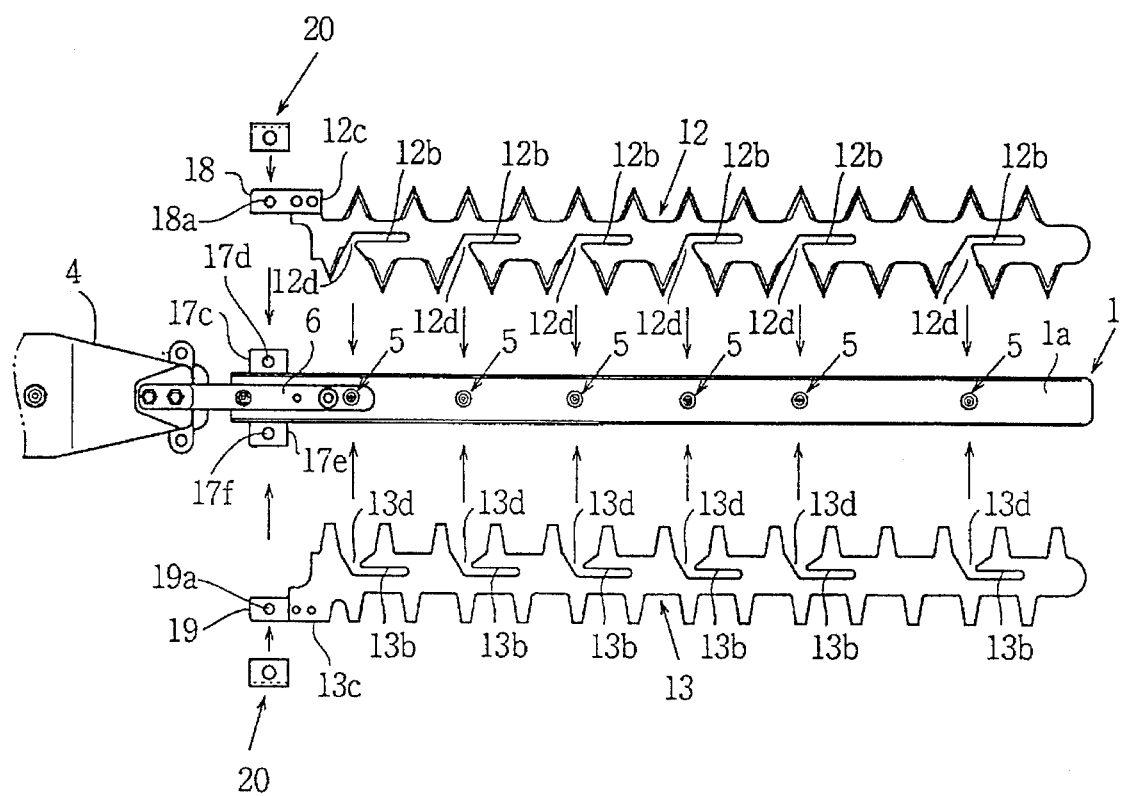
FIG. 15 is an explanatory top plane view, illustrating a pair of cutter bars of FIG. 18 being attached into a position between the two guide plates at a first step.

Again referring to FIGS. 10, 11 and further referring to FIG. 15, the upper cutter bar 12 has six elongate guide holes 12b communicated with six cutouts 12d respectively, each of these cutouts 12d is formed at one end of an elongate guide hole 12b to permit the passing of a spacer member 5c engaging with a coupling means 5 into and out of the guide hole 12b. Similarly, the lower cutter bar 13 also has six elongate guide holes 13b communicated with six cutouts 13d respectively, each of these cutouts 13d is formed at one end of an elongate guide hole 13b to permit the passing of a spacer member 5c engaging with a coupling means 5 into and out of the guide hole 13b. Here, all the cutouts 12d formed in communication with the guide holes 12b on the upper cutter bar 12 are arranged to face in a direction opposite to the projecting direction of the connecting portion 12c of the cutter bar 12. Similarly, all the cutouts 13d formed in communication with the guide holes 13b on the lower cutter bar 13 are arranged to face in a direction opposite to the projecting direction of the connecting portion 13c of the cutter bar 13.

FIG. 15 illustrates the operation of attaching the upper cutter bar 12 and the lower cutter bar 13 in position between the pair of guide plates 1a and 1b which have already been assembled and fixed properly in their appropriate positions. As shown in FIG. 15, at first, the upper cutter bar 12 is disposed on the left side (when viewed from the rear end of the cutting section) of the pair of guide plates 1a and 1b, with the connecting portion 12c (carrying the connecting piece 18) facing outwardly. Meanwhile, the upper cutter bar 13 is arranged on the right side (when viewed from the rear end of the cutting section) of the pair of guide plates 1a and 1b, with the connecting portion 13c (carrying the connecting piece 19) facing outwardly. Then, in the directions represented by numerous vertical arrows shown in FIG. 15, the upper cutter bar 12 is inserted rightwardly into the space between the guide plates 1a and 1b. At the same time, the upper cutter bar 13 is inserted leftwardly into the same space.

During the insertion movement as referred above, all the cutouts 12d communicated with the elongate guide holes 12b of the upper cutter bar 12, are aligned with all the spacer members 5c engaging with the respective coupling means 5, so that the spacer members 5c can pass through the cutouts 12d and be engaged in the holes 12b. Similarly, all the cutouts 13d communicated with all the elongate guide hole are aligned with the spacer members 5c, so that the spacer members 5c can also pass through the cutouts 18d and be engaged in the holes 18b.

Figure 16:
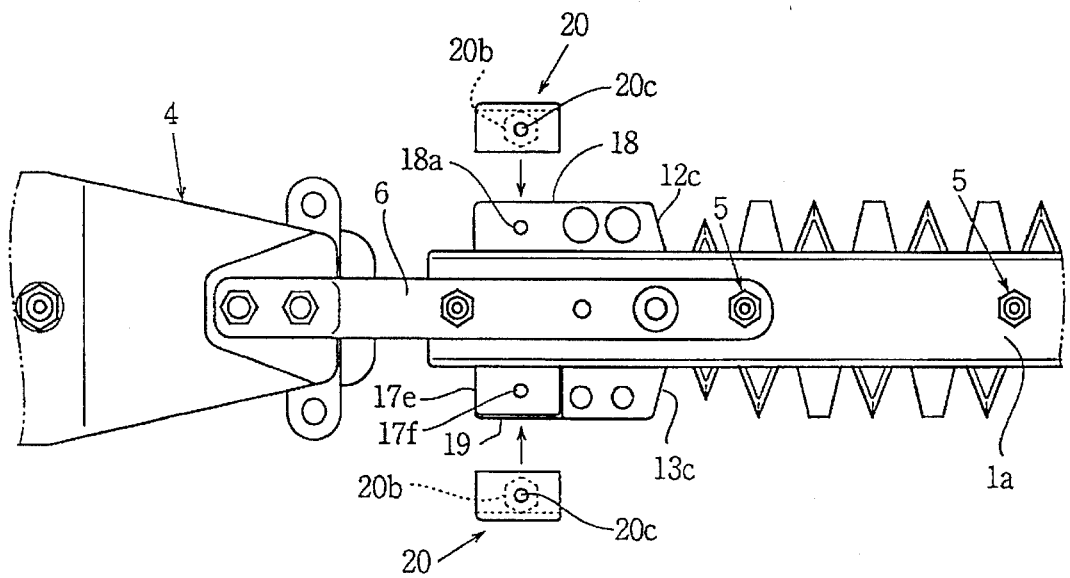
FIG. 16 is an enlarged top plane view, illustrating in detail the rear end portion of the cutting section.
Figure 17:
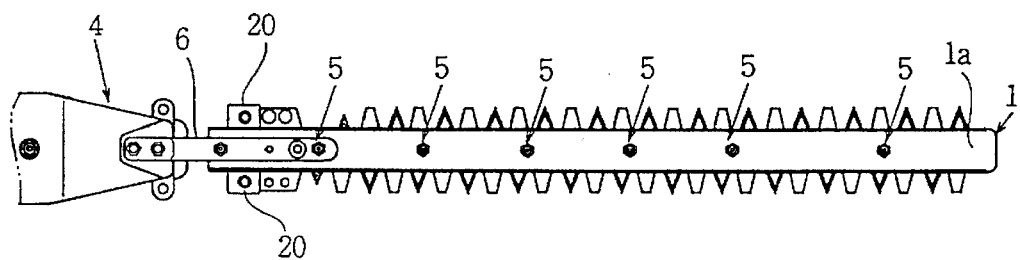
FIG. 17 is an explanatory top plane view, illustrating the attachment of the two cutter bars of FIG. 10 has been completed finished.
Figure 18:
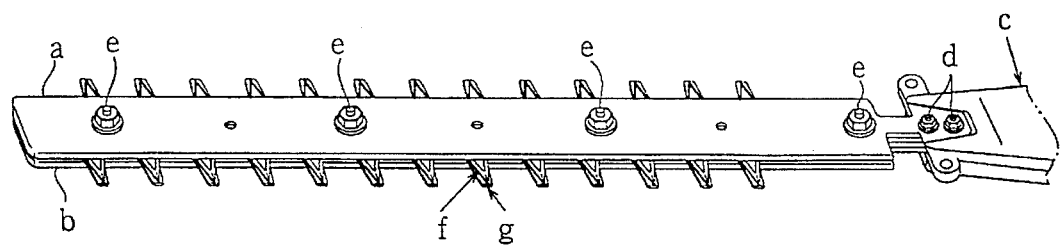
FIG. 18 is a perspective view showing a conventional cutting section for a mower or a hedge trimmer.

Referring to FIG. 16, after the pair of cutter bars 12 and 18 have been inserted in position between the guide plates 1a and 1b, the underside face of connecting piece 18 (see FIG. 15) of the upper cutter bar 12 will be engaged on the upper surface of the connecting portion 17c of the upper driving member 7a, and the two members in contact with each other are embraced by the bracket 20. Then, a bolt (not shogun) is passed through the pair of through holes 20c of the bracket 20, the through hole 18a of the connecting piece 18, the through hole 17d of the connecting portion 17c, and be screwed up in the nut 20b so that the connecting piece 18 and connecting portion 17c can be firmly fixed together in place. Similarly, the upper surface of connecting piece 19 of the lower cutter bar 18 will be engaged with the underside face of the connecting portion 17e of the lower driving member 7b, and the two members in contact with each other are embraced by the bracket 20. Then, a bolt (not shown) is passed through the pair of through holes 20c of the bracket 20, the through hole 19a of the connecting piece 19, the through hole 17f of the connecting portion 17e, and be screwed up in the nut 20b so that the connecting piece 19 and connecting portion 17e can be firmly fixed together in place. In this way, both the upper cutter bar 12 and the lower cutter bar 13 are exactly connected with the respective driving members 7a and 7b, and the assembling operation of the cutter bars 12 and 13 is thus completed.

On the other hand, when the cutter bars 12 and 13 become blunt after being used for a period of time and become necessary to be replaced by new ones, the operation for removing the used blunt cutter bars may be performed in an reversed order opposite to the above attachment operation. Namely, upon loosening and removing the bolts (not shown) formerly screwed in the nuts 20b of the upper and lower brackets 20, and by holding at the connecting pieces 18 and 19, the two cutter bars 12 and 13 may be moved slightly in the longitudinal directions thereof such that the respective cutouts 12d and 13d become aligned with the respective spacer members 5 engaging with the respective coupling members 5, thereby the upper and lower cutter bars 12 and 13 may be removed leftwardly and rightwardly respectively from the space between the upper and lower guide plates 1a and 1b, thus completing the detachment of the used blunt cutter bars.

In view of the above descriptions and explanations, it is understood that, the cutting section for a mower or a hedge trimmer according to the present invention, once assembled in the above-discussed manner, is not necessary to be disassembled when a pair of used blunt cutter bars are to be replaced by new or newly treated ones. In particular, since the transmission case and a pair of guide plates do not have to be dismantled, the operation for changing the cutter bars become much easier, such operation can be performed quickly even in a field where the grass cutting operation is only half-finished. Therefore, the use of the cutting section for a mower or the like, as constructed in accordance with the present invention, permits the grass cutting or similar operations to be performed at a greatly improved efficiency as compared with prior art.

In both of the above described embodiments, the upper cutter bar is provided with a plurality of triangular cutting blades, the lower cutter bar is provided with a plurality of trapezoidal cutting blades. However, it is also possible that the upper cutter bar is provided with a plurality of trapezoidal cutting blades, whereas the lower cutter bar is provided with a plurality of triangular cutting blades. On the other hand, both the upper and lower cutter bars may be provided with merely one type of cutting blade, i.e., either trapezoidal cutting blades or triangular cutting blades. Anyway, there is not any particular limitation to the shape and number of the cutting blades of both the upper and lower cutter bars.

Moreover, in both of the above described embodiments, the cutouts of the upper cutter bar and the cutouts of the lower cutter bar, are allowed to be formed in communication with either central or end portions of the elongate holes, provided that a pitch distance between two adjacent elongate holes satisfies a pitch distance between two adjacent spacer members engaged with corresponding coupling means.

While the presently preferred embodiments of the present invention have been shown and described above, it is to be understood that this disclosure is only for the purpose of illustration and that various changes and modifications may be made without departing from the scope of the invention as set forth in the appended claims.

What is claimed is:

1. A cutting section for a mower or a hedge trimmer, said cutting section comprising:

a pair of elongate guide plates arranged at upper and lower positions respectively by virtue of several coupling means arranged in the longitudinal direction thereof, the pair of elongate guide plates being secured at their rear ends on a transmission case of the mower or hedge trimmer;

a pair of elongate cutter bars arranged one on top of another and received in a space formed between the pair of elongate guide plates, the rear end of each cutter bar being formed with a connecting portion projecting laterally and outwardly beyond the guide plates; and a pair of driving members arranged at upper and lower positions respectively and connected with the respective elongate cutter bars through the respective connecting portions, for reciprocatingly driving the elongate cutter bars by means of a crank mechanism;

wherein each elongate cutter bar is formed with a plurality of elongate guide holes along the length thereof, and each such elongate guide hole is communicated with a cutout formed thereon, so that the two bars are adapted to be installed in position between the pair of elongate guide plates and to be detached therefrom without disassembling any one of the guide plates; and wherein the cutouts formed in communication with the guide holes on each elongate cutter bar are divided into two groups, with One group arranged having the cutouts open in a direction opposite to the direction in which the cutouts of the other group open.

2. The cutting section for a mower or a hedge trimmer according to claim 1, wherein each driving member is connected with a corresponding cutter bar by securing the outer end of the driving member to the connecting portion of the corresponding cutter bar using at least one screw member.

3. The cutting section for a mower or a hedge trimmer according to claim 1, wherein one group of cutouts located close to the rear end of each cutter bar are arranged to face in a direction opposite to the projecting direction of the connecting portion of the cutter bar, and the other group of cutouts located close to the front end of the cutter bar are arranged to face in the same direction as the projecting direction of the connecting portion.

4. The cutting section for a mower or a hedge trimmer according to claim 3, wherein the pair of elongate cutter bars are adapted to be installed in position between the pair of elongate guide plates and to be detached therefrom, by pivoting the pair of cutter bars like a pair of scissors without disassembling any one of the guide plates.

5. The cutting section for a mower or a hedge trimmer according to claim 1, wherein each driving member is connected with a corresponding cutter bar by securing the outer end of the driving member to the connecting portion of the corresponding cutter bar using a U-shaped retaining member.

6. The cutting section for a mower or a hedge trimmer according to claim 5, wherein the U-shaped retaining member is used in combination with a bolt and a nut.

7. The cutting section for a mower or a hedge trimmer according to claim 6, wherein the nut is welded on the outer surface of one side wall of the U-shaped retaining member.

8. The cutting section for a mower or a hedge trimmer, said cutting section comprising:

a pair of elongate guide plates arranged at upper and lower positions respectively by virtue of several coupling means arranged in the longitudinal direction thereof, the pair of elongate guide plates being secured at their rear ends on a transmission case of the mower or hedge trimmer;

a pair of elongate cutter bars arranged one on top of another and received in a space formed between the pair of elongate guide plates, the rear end of each cutter bar being formed with a connecting portion projecting laterally and outwardly beyond the guide plates; and a pair of driving members arranged at upper and lower positions respectively and connected with the respective elongate cutter bars through the respective connecting portions, for reciprocatingly driving the elongate cutter bars by means of a crank mechanism;

wherein each elongate cutter bar is formed with a plurality of elongate guide holes along the length thereof, and each such elongate guide hole is communicated with a cutout formed thereon, so that the two bars are adapted to be installed in position between the pair of elongate guide plates and to be detached therefrom without disassembling any one of the guide plates; and wherein the cutouts formed in communication with the elongate guide holes on each cutter bar are arranged to face in a direction opposite to the projecting direction of the connecting portion of the cutter bar.

9. The cutting section for a mower or a hedge trimmer according to claim 8, wherein the pair of elongate cutter bars are adapted to be installed in position between the pair of elongate guide plates and to be detached therefrom, by laterally moving the two cutter bars leftwardly and rightwardly respectively without disassembling any one of the guide plates.

* * * * *